United States Patent
Krysinski et al.

(10) Patent No.: US 8,985,502 B2
(45) Date of Patent: Mar. 24, 2015

(54) AIRCRAFT PROVIDED WITH A DEVICE FOR REDUCING VIBRATION, AND A METHOD THEREFOR

(75) Inventors: Tomasz Krysinski, Marseille (FR); Francois Malburet, Coudoux (FR)

(73) Assignees: Airbus Helicopters, Marignane Cedex (FR); Ecole Naitonale Supérieure d'Arts et Métiers—E.N.S.A.M, Paris (FR)

( * ) Notice: Subject to any disclaimer, the term of this patent is extended or adjusted under 35 U.S.C. 154(b) by 316 days.

(21) Appl. No.: 13/477,316

(22) Filed: May 22, 2012

(65) Prior Publication Data

US 2012/0298794 A1 Nov. 29, 2012

(30) Foreign Application Priority Data

May 27, 2011 (FR) ...................... 11 01644

(51) Int. Cl.
*B64C 27/82* (2006.01)
*B64C 27/00* (2006.01)

(52) U.S. Cl.
CPC ......... *B64C 27/001* (2013.01); *B64C 2027/002* (2013.01); *B64C 2027/004* (2013.01)
USPC .................... 244/17.19; 244/17.11

(58) Field of Classification Search
USPC .......................... 244/17.11, 17.19
See application file for complete search history.

(56) References Cited

U.S. PATENT DOCUMENTS

| | | | |
|---|---|---|---|
| 3,477,665 A | | 11/1969 | Legrand |
| 4,365,770 A | * | 12/1982 | Mard et al. ................. 244/17.11 |
| 4,819,182 A | * | 4/1989 | King et al. .................... 700/280 |
| 5,310,137 A | | 5/1994 | Yoerkie |
| 5,316,240 A | * | 5/1994 | Girard et al. ................ 244/17.27 |
| 5,332,072 A | * | 7/1994 | Crannage ...................... 188/378 |
| 5,810,319 A | * | 9/1998 | von Flotow et al. .......... 248/550 |

(Continued)

FOREIGN PATENT DOCUMENTS

| | | |
|---|---|---|
| EP | 0501659 A1 | 9/1992 |
| EP | 0541277 A2 | 5/1993 |

(Continued)

OTHER PUBLICATIONS

"Helitech 91—Review", Aircraft Engineering, Bunhill Publications Ltd. London, GB, vol. 63, No. 11, Nov. 1, 1993 (Nov. 1, 1991), pp. 12-14, XP000236639.

(Continued)

*Primary Examiner* — Brian M O'Hara
*Assistant Examiner* — Keith L Dixon
(74) *Attorney, Agent, or Firm* — Brooks Kushman P.C.

(57) ABSTRACT

An aircraft (1) provided with a main gearbox (3) fastened to a load-bearing structure (2) via at least three suspension bars (5). An active vibration absorber (10) is fastened around each suspension bar (5), each vibration absorber (10) being provided with a first mass (11) connected to the associated suspension bar (5) via first resilient means (21), and with a second mass (12) connected to the first mass (11) via second resilient means (22), said vibration absorber (10) having a force generator (15) interposed between the first mass (11) and the second mass (12) and inputting a control force on being instructed by a control unit (16) as a function of information coming from at least one first measurement sensor (17) for sensing monitoring parameters for monitoring the associated suspension bar.

20 Claims, 2 Drawing Sheets

(56) References Cited

U.S. PATENT DOCUMENTS 6,067,853 A     5/2000  Thevenot
7,857,255 B2 * 12/2010  Pancotti et al. ............ 244/17.27

FOREIGN PATENT DOCUMENTS

| | | | |
|---|---|---|---|
| FR | 1506385 | A  | 12/1967 |
| FR | 2566862 | A1 | 1/1986  |
| FR | 2770825 | A1 | 5/1992  |
| FR | 2731405 | A1 | 9/1996  |

OTHER PUBLICATIONS

Search Report and Written Opinion; Application No. FR 1101644; dated Dec. 5, 2011.

* cited by examiner

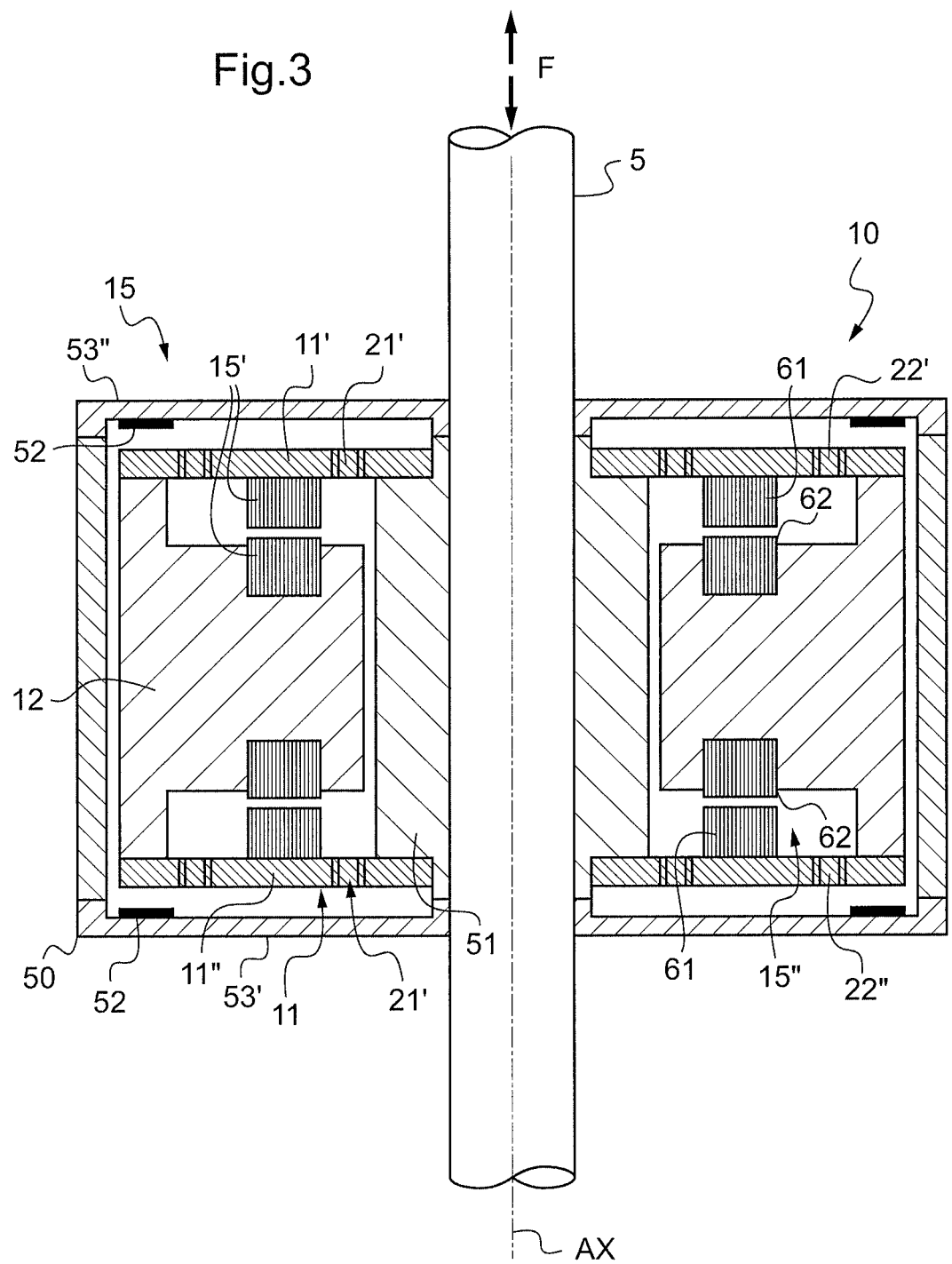

US 8,985,502 B2

AIRCRAFT PROVIDED WITH A DEVICE FOR REDUCING VIBRATION, AND A METHOD THEREFOR

CROSS REFERENCE TO RELATED APPLICATIONS

This application claims priority to FR 11 01644 filed on May 27, 2011, the disclosure of which is incorporated in its entirety by reference herein.

BACKGROUND OF THE INVENTION (1) Field of the Invention

The present invention relates to an aircraft, in particular a rotary-wing aircraft, provided with a device for reducing vibration, and to a method therefor.

The invention thus lies within the limited technical field of devices for reducing aircraft vibration.

(2) Background Art

Among aircraft, there can be distinguished, in particular, aircraft provided with at least one rotary wing connected to a load-bearing structure, which load-bearing structure is usually referred to as the "airframe" or as the "fuselage".

Such an aircraft also has a powerplant that drives a main gearbox secured to the load-bearing structure of the aircraft. The main gearbox then includes a mast that drives the rotary wing in rotation.

It can be noted that the main gearbox is often connected to the load-bearing structure via an end wall and via auxiliary fastening means generally comprising three or four suspension bars. The structure for mounting the rotary wing and including the main gearbox and the suspension bars is sometimes referred to as the "pylon" by the person skilled in the art, because of its shape.

The rotary wing and/or the main gearbox can give rise to vibration that can adversely affect the comfort of the occupants of the cabin by generating vibratory movements and noise inside said cabin. In addition, items of equipment of the aircraft that are arranged inside the load-bearing structure can be deteriorated by the vibration generated by the assembly comprising the main gearbox and the rotary wing.

Various devices are known for at least reducing the vibration felt in the cabin in order to improve the comfort of the occupants of said cabin.

In a first solution, it is possible to provide passive devices acting at a predetermined frequency. Although appealing, that solution has limitations if the vibration to be reduced changes frequency.

In a second solution, it is possible to use active devices in the cabin. That solution suffers from the drawback of acting only on vibration that is present in the cabin.

In a third solution, devices are arranged in the form of pendulum dampers acting on the rotary wing. That solution aims to act on the vibration at source, but it suffers from the drawback of acting on parts of the aircraft that are essential for its operation.

Reference can be made, for example, to the book by François Malburet and Tomasz Krysinski entitled "Mechanical Vibrations: Active and Passive Control" and published by ISTE).

More particularly, Document FR 2 731 405 suggests fastening a main gearbox to a helicopter load-bearing structure via resilient connection devices controlled via a computer as a function of information received by sensors arranged on the fuselage, in order to minimize dynamic excitation exerted at the center of gravity of the fuselage. Such a resilient connection device may comprise a cylinder defining two chambers separated by a piston. That piston has a rod connected to the main gearbox, while a bar secured to the cylinder is connected to the load-bearing structure. In addition, with the chambers of the cylinder being interconnected via a pipe, it is possible to control the resilient connection device by controlling the head loss generated by said pipe.

Similarly, instead of providing suspension bars per se, Document EP 0 501 659 provides actuators that are formed integrally with mechanical struts so as to interconnect a main gearbox and a load-bearing structure.

Document FR 1 506 385 mentions the use of suspension bars and of a bar including a resilient connection associated with an excitation jack.

Document FR 2 770 825 proposes to arrange two-stage resonators in the cabin at the seats of an aircraft for the purpose of at least reducing the vibration felt in said cabin, each two-stage resonator being controlled by a control unit implementing a plurality of successive operations.

Each two-stage resonator comprises a first resonator presenting a predetermined resonance frequency, and a second resonator associated with the first resonator, the second resonator being frequency-adjustable by means of an actuator.

That architecture is, in particular, applied to the helicopter EC 725® MKII+.

Document FR 2 566 862 presents an aircraft provided with a powerplant and with a main gearbox that are disposed on a raft, actuators being disposed between the raft and the fuselage of the aircraft.

Document U.S. Pat. No. 5,310,137 presents an active noise control system provided with beams of a load-bearing structure, those beams including actuators.

Document EP 0 541 277 presents actuators for inputting forces into a structure.

Also known is the Document TROCKMORTON ALEXANDER: "HELITECH 91\REVIEW", AIRCRAFT ENGINEERING, BUNHILL PUBLICATIONS LTD. LONDON, GB, vol. 63, No. 11, Nov. 1, 1991 pages 12-14.

BRIEF SUMMARY OF THE INVENTION

An object of the present invention is thus to propose an aircraft provided with a system for reducing the discomfort caused by a main gearbox and by a rotary wing.

The invention provides an aircraft provided with a load-bearing structure and with a main gearbox for driving a rotary wing in rotation, the main gearbox being fastened to the load-bearing structure via at least three suspension bars, each of which extends along a respective extension axis.

This aircraft is remarkable in particular in that it includes a vibration reduction system provided with an active vibration absorber fastened around each suspension bar, each vibration absorber being provided with a first mass connected to the associated suspension bar via first resilient means allowing the first mass to move along said suspension bar, and with a second mass connected to the first mass via second resilient means allowing the second mass to move along said suspension bar, the first mass and the second mass each surrounding the associated suspension bar to induce vibration absorption along an absorption axis coinciding with the extension axis along which the suspension bar extends, the vibration absorber having a force generator interposed between the first mass and the second mass and inputting a control force on being instructed by a control unit as a function of information coming from at least one first measurement sensor for sensing monitoring parameters for monitoring the associated suspension bar.

It should be noted that the first mass and the second mass are sometimes referred to as "seismic masses".

The aircraft thus includes a vibration absorber of the two-stage resonator type fastened to each suspension bar, a single vibration absorption axis of a vibration absorber coinciding with the extension axis along which the associated suspension bar extends. A single control unit can then control all of the force generators of the vibration absorbers.

The vibration generated by the assembly comprising the rotary wing and the main gearbox is, in particular, transmitted to the load-bearing structure via suspension bars.

By arranging two-stage active vibration absorbers on each suspension bar, action is taken in the vicinity of the source of emission of discomfort in order to maximize the effectiveness of the vibration reduction system.

The use of active vibration absorbers having two stages thus makes it possible to reduce the vibration in elements situated downstream from the suspension bars, namely in elements fastened to the load-bearing structure and in particular in the cabin, and to reduce the noise emitted by the vibrating elements.

In addition, since each vibration absorber is active, it is possible to adjust it in real time as a function of numerous factors that can modify the vibration level in the cabin, in particular, it being possible for such fluctuating factors to include rotational speed of the rotary wing, or mass of the aircraft in flight, said mass decreasing, in particular, as fuel is consumed, for example.

The first stage of the vibration absorber represented by the first mass connected to a suspension bar then presents, for example, a predetermined resonance frequency, and the second stage of the vibration absorber represented by the second mass connected to the first mass presents a resonance frequency adjustable by means of the force generator. Broadly speaking, the vibration absorber emits variable vibration into the associated suspension bar in order to counter the vibration to be reduced.

Reference can be made, in particular, to Document FR 2 770 825, for example, for information about such a vibration absorber.

In another aspect, the control unit optionally puts a bound on the control force of a vibration absorber so as not to damage the associated suspension bar as a function of the information coming from the first measurement sensors.

In addition, it should be noted that each vibration absorber is fastened to a suspension bar in such a manner as to constitute means external to the suspension of the main gearbox, and thus does not constitute a member arranged between two mechanical struts of said suspension, for example. The suspension bar thus performs its function of holding the main gearbox in position independently of the operation of the associated vibration absorber, any jamming of said vibration absorber then having little impact on said suspension bar.

In addition, the energy to be supplied by the force generator for adjusting the vibration absorber is minimized.

Finally, it should be noted that an existing aircraft can readily be modified so as to comply with the invention, the vibration reduction system adapting to fit the existing suspension bars of such an existing aircraft.

This aircraft may have one or more of the following additional characteristics.

For example, the first measurement sensor of a suspension bar includes either a force sensor for sensing forces passing through said suspension bar, or an accelerometer arranged at an end of said suspension bar that is fastened to the load-bearing structure.

It is then possible in particular, by means of the first information coming from the first sensors, for the control unit to avoid inputting forces exceeding a predetermined threshold into the bar.

In addition, in a first embodiment, on the basis of the first information, the control unit deduces a vibration level to be reduced that is representative of the vibration level present in the cabin.

In a second embodiment, said vibration reduction system has at least one second measurement sensor arranged inside the load-bearing structure and, for example, in a cabin of the aircraft, each second measurement sensor communicating with said control unit, and each second measurement sensor being chosen from a list including a noise sensor and an accelerometer in non-restrictive manner.

For example, an analysis unit of the control unit determines the sinusoidal components of the vibration to be reduced by means of the values measured by the first or second measurement sensors depending on the embodiment.

An analysis unit of the control unit then determines characteristics of the vibration level to be reduced on the basis of said sinusoidal components.

Independently of the embodiment, a computation unit determines the forces to be generated in the suspension bars by means of a transfer matrix predetermined by the manufacturer.

For example, during an identification stage, the manufacturer places a vibration absorber on a single suspension bar, and then measures the effect of said vibration absorber while the rotary wing is being driven in rotation by injecting a plurality of distinct forces into the absorber by means of the force generator. The manufacturer repeats these operations on each suspension bar and then establishes a transfer matrix by means of the measured data.

In addition, after the forces to be generated have been established by the computation unit, a filter unit of the control unit optionally puts a bound on said forces to be generated so that they do not exceed a predetermined threshold relating to the strength of a suspension bar.

It can be understood that the control unit may be a computer or the like, the analysis unit, the computation unit, and the filter unit being, for example, distinct code segments of a computer program or indeed physical units provided with electronic equipment.

In another aspect, the force generator may, for example, have at least one electromagnetic actuator.

In addition, a vibration absorber may have movement-limiting means for limiting the movement of at least one of the seismic masses, namely the first mass and/or the second mass, in order to limit the vibration generated by said vibration absorber, for example.

In a preferred variant, the first mass has an upper mass and a lower mass, each of which is connected via a spring to the associated suspension bar, said second mass being fastened to the upper mass via an upper resilient member of the second resilient means and to the lower mass via a lower resilient member of the second resilient means, the force generator comprising an upper electromagnetic actuator between the second mass and the upper mass, and a lower electromagnetic actuator between the second mass and the lower mass.

In addition, at least one of said first and second masses may include damper means.

It should be noted that each seismic mass presents a natural damping coefficient resulting from friction forces. However, if necessary, it is conceivable to arrange damper means between the first mass of a vibration absorber and the associated suspension bar, and/or between the first mass and the second mass of a vibration absorber.

In addition, at least one resilient means may comprise at least one volute spring, it thus being possible for the resilient means to represent guide means.

In another aspect, the aircraft has a speed sensor for sensing the rotational speed of the rotary wing, which speed sensor communicates with said control unit.

In addition to providing an aircraft, the invention provides a method of minimizing vibration in the cabin of such an aircraft, said aircraft being provided with a load-bearing structure and with a main gearbox for driving a rotary wing in rotation, the main gearbox being fastened to said load-bearing structure via at least three suspension bars.

The method is remarkable in particular in that, with said aircraft having a vibration reduction system provided with an active vibration absorber fastened to each suspension bar, each vibration absorber being provided with a first mass and with a second mass between which a force generator is arranged, the control unit estimates control forces for minimizing a vibration level relating to the vibration level present in said cabin, and then the control unit puts a bound on said control forces so as to obtain forces that are bounded as a function of the forces currently passing through each suspension bar so that each current force does not exceed a predetermined threshold, the control unit sending an instruction to said force generators so that said force generators generate the determined bounded forces.

In accordance with this method, action is taken on the suspension bars of a main gearbox of an aircraft, in particular a helicopter, in order to reduce the vibration in the cabin. The suspension bars of the aircraft are thus used, and the control force of a two-stage active vibration absorber is bounded so as to guarantee a force level that is acceptable in each suspension bar.

For example, such a method may comprise the following steps:

forces currently passing through each suspension bar are measured;

the control unit determines a vibration level relating to the vibration level present in said cabin, and then estimates the control force to be delivered by each force generator of each absorber of the vibration reduction system in order to minimize said vibration level, the control unit bounding said control forces so as to obtain forces that are bounded as a function of the current forces so that each current force does not exceed a predetermined threshold;

the control unit sends an instruction to said force generators so that said force generators generate said bounded forces;

the control unit performs the following operations iteratively:

the control unit determines the actual vibration level resulting from the latest instruction transmitted to said force generators for countering the latest measured vibration level;

the control unit determines a current vibration level and then determines the difference between said current vibration level and said latest vibration level; and the control unit determines new bounded forces on the basis of said difference and of the forces currently being exerted in each suspension bar, and then controls the force generators.

In a first implementation, the control unit determines a vibration level relating to the vibration level present in the cabin as a function of the forces currently being exerted in each suspension bar, or as a function of accelerations measured in an end of each suspension bar that is connected to the load-bearing structure.

In a second implementation, the control unit determines a vibration level relating to the vibration level present in said cabin as a function of information coming from at least one acoustic sensor and/or from at least one accelerometer present in the cabin of the aircraft.

Finally, it is possible to measure the rotational speed of the rotary wing in order to synchronize the bounded control forces generated by the force generators with the rotational frequency of said rotary wing in order to maximize the effectiveness of the system.

BRIEF DESCRIPTION OF THE SEVERAL VIEWS OF THE DRAWINGS

The invention and its advantages appear in more detail from the following description of embodiments given by way of illustration and with reference to the accompanying figures, in which:

FIG. 3 is a section view of a vibration absorber arranged on a suspension bar.

Elements that are present in more than one figure are given the same references in each of them.

DETAILED DESCRIPTION OF THE INVENTION

Figure 1:
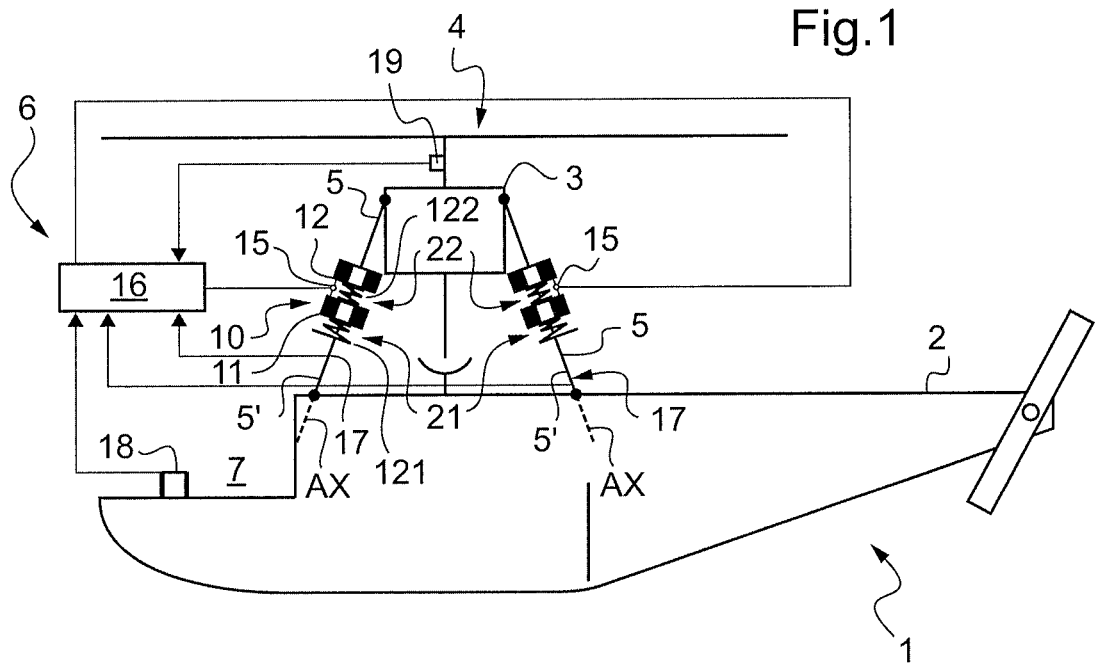
FIG. 1 shows and explains an embodiment of an aircraft of the invention.

FIG. 1 shows an aircraft 1 provided with a load-bearing structure 2 including a cabin 7. In addition, the aircraft 1 has a main gearbox 3 meshed with a powerplant (not shown), the main gearbox 3 driving a rotary wing 4 of the aircraft 1 in rotation.

This main gearbox 3 is fastened to the load-bearing structure 2, in particular via a suspension comprising at least three suspension bars 5.

In operation, the assembly comprising the main gearbox 3 and the rotary wing 4 vibrates, the vibration being transmitted to the load-bearing structure 2 via the connection means for connecting said assembly to said load-bearing structure 2, in particular via the suspension bars 5.

The aircraft 1 then has a vibration reduction system 6 for, for example, improving the comfort of the passengers in the cabin 7 by minimizing the vibration and the noise in the cabin, or indeed for preventing equipment in said cabin from being damaged by the vibration of said assembly.

This vibration reduction system 6 includes one two-stage active vibration absorber 10 per suspension bar, which vibration system is arranged around the corresponding suspension bar. Each vibration absorber 10 generates vibration in the associated bar along an absorption axis AX that coincides with the extension axis along which the associated bar extends.

In the variant, the vibration generated by the vibration reduction system 6 is aimed at at least reducing the vibration felt in the cabin, or indeed the noise present in said cabin:

by minimizing the forces passing through the suspension bars or by minimizing the accelerations of the end 5' of each suspension bar that is connected to the load-bearing structure 2, the excitation of the suspension bars generating, in particular, the vibration felt in the cabin; or by minimizing the dynamic forces exerted at the elastic center of the load-bearing structure, it being possible for said elastic center to be excited by forces passing through the suspension bars and also by other means for connecting the main gearbox 3 to the load-bearing structure 2, such as the end wall of said main gearbox; or by minimizing the actual vibration measured in said cabin.

Each vibration absorber 10 then includes a first moving mass 11 representing a first stage, which first mass 11 is mounted to slide around an associated suspension bar 5. The first mass 11 is connected to the suspension bar 5 via first resilient means 21. The first mass 11 is associated with a first damping coefficient resulting from the friction of said first mass 11 as it moves in translation along the suspension bar, or from dedicated first damper means.

In addition, each vibration absorber 10 includes a second moving mass 12 representing a second stage, which second mass 12 is mounted to slide around the associated suspension bar 5. The second mass 12 is connected to the first mass 11 via second resilient means 22. The second mass 12 is associated with a second damping coefficient resulting from the friction of said second mass 12 as it moves in translation along the suspension bar, or from dedicated second damper means.

A force generator 15 is then arranged between the first mass 11 and the second mass 12, e.g. an electromagnetic force generator 15.

In addition, each vibration absorber 10 may include means for limiting the movement in translation of at least one of said first and second masses 11 and 12, such as, for example, abutments fastened to the associated suspension bar.

In the embodiment shown in FIG. 1, the first mass 11 is fastened to a shoulder on the associated suspension bar via a first spring 121, the second mass 12 being fastened to the first mass 11 via a second spring 122.

FIG. 3 shows a preferred embodiment of a vibration absorber 10 arranged on a suspension bar.

The vibration absorber 10 has a casing 50 through which the suspension bar 5 passes, and that is fastened to said suspension bar 5 by usual means.

The first mass 11 is then fastened to an inner periphery 51 of the casing in contact with the suspension bar 5 via first resilient means. More precisely, the first mass 11 comprises an upper mass 11' and a lower mass 11", each of which is connected via a volute spring 21' to the suspension bar 5 via the inner periphery 51.

The second mass 12 is then fastened to the upper mass 11' via an upper resilient member 22' of the second resilient means 22, e.g. of the volute spring type, and to the lower mass 11" via a lower resilient member 22" of the second resilient means 22, e.g. of the volute spring type.

In addition, it should be noted that the casing 50 is provided with movement limitation means for limiting the movement of the first and second masses 11 and 12, which means include a lower base 53' and an upper base 53" of said casing, for example. In addition, each base may have buffer pads 52.

Furthermore, the force generator 15 is provided with an upper electromagnetic actuator 15' between the second mass 12 and the upper mass 11", and with a lower electromagnetic actuator 15" between the second mass 12 and the lower mass 11".

Each electromagnetic actuator may include a coil 61 electrically powered by a control unit, and metal means 62.

With reference to FIG. 1, the vibration reduction system 6 includes at least one control unit 16 for controlling the force generators 15, e.g. a single control unit 16 controlling all of the force generators 15. Each control unit 16 acts on at least one electromagnetic force generator 15 optionally by determining the electrical characteristics of any current conveyed to said force generator 15.

The control unit 16 is then connected to at least one first measurement sensor 17 for sensing parameters for monitoring each suspension bar. The first measurement sensor 17 of a suspension bar 5 includes either a force sensor for sensing forces passing through said suspension bar 5, or an accelerometer arranged at an end 5' of said suspension bar that is fastened to the load-bearing structure.

Independently of the variant implemented, a control unit uses the first measurement sensors 17 so as not to transmit an instruction to the vibration absorbers 10 that might give rise to forces passing through the suspension bars 5 that are greater than a predetermined threshold.

Thus, depending on the method implemented, a control unit 16 determines a vibration level representative of the vibration level present in the cabin 7, by means of information coming from sensors provided, in particular, for that purpose.

In addition, this control unit 16 estimates the value of a control force to be transmitted to the force generators 15, e.g. in the form of an electric current, in order to minimize said vibration level.

Known methods may be used.

The control unit then limits the control force if necessary so as to obtain a bounded force per force generator 15, as a function of the forces currently passing through each suspension bar 5 so that each current force does not exceed a predetermined force.

The control unit 16 then sends an instruction to the force generators 15 so that said force generators 15 generate the bounded forces.

For example, the forces currently passing through each suspension bar 5 are measured.

The control unit 16 then determines a vibration level relating to the vibration level present in the cabin 7, and then estimates the control force to be delivered by the force generators 15 in order to minimize the vibration level before bounding these control forces so as to obtain forces that are bounded if necessary. The control unit may then use a transfer matrix that is pre-established by the manufacturer in order to obtain the bounded force to be delivered.

The control unit 16 then sends an instruction to the force generators 15 so that said force generators 15 generate said bounded forces, and then implements the following operations iteratively:

the control unit 16 determines the actual vibration level resulting from the latest instruction transmitted to the force generators 15 for countering the latest measured vibration level;

the control unit 16 determines a current vibration level and then determines the difference between said current vibration level and the latest vibration level.

the control unit 16 determines new bounded forces on the basis of said difference and of the forces currently being exerted in each suspension bar 5, and then controls the force generators 15.

In addition, the control unit 16 may be connected to a speed sensor 19 for sensing the rotational speed NR of the rotary wing 4. By means of the number of blades of this rotary wing 4, the control unit 16 determines the rotational frequency of said rotary wing. A control unit 16 can then transmit instructions to force generators adjusted as a function of the rotational speed NR of the rotary wing, at a frequency synchronous with the rotational frequency of said rotary wing.

Thus, in this variant of the method, the rotational speed NR of the rotary wing 4 is measured in order to synchronize the control force generated by the force generators 15 with the rotational frequency of said rotary wing 4.

In addition, in the embodiment of FIG. 1, the control unit 16 determines the vibration level relating to the vibration level present in the cabin 7 as a function of information coming from at least one acoustic sensor and/or from at least one accelerometer of the load-bearing structure.

For example, the vibration and the noise to be reduced may be measured directly by means of at least one acoustic sensor and/or by means of at least one accelerometer of the load-bearing structure, the acoustic sensor and/or the accelerometer being present in the cabin 7 of the aircraft 1.

Alternatively, for example, the excitation forces may be quantified at each fastening between the gearbox and the fuselage, including at the suspension bars. The force generators are then controlled in such a manner as to minimize the excitation moment at the elastic center of the load-bearing structure.

The first measurement sensors 17 are then used to limit the forces passing through the monitoring bars.

Figure 2:
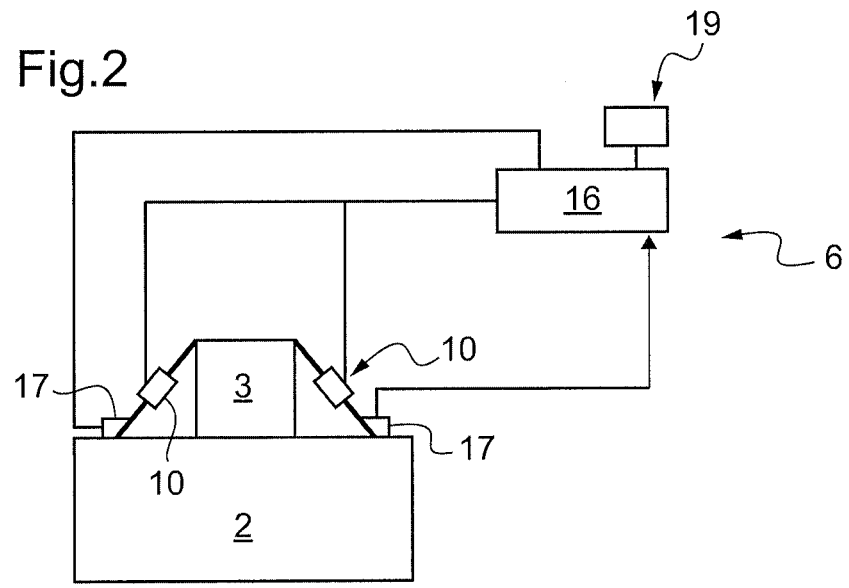
FIG. 2 is a diagram showing and explaining an alternative embodiment.

In the embodiment of FIG. 2, the control unit 16 determines a vibration level relating to the vibration level present in the cabin 7 as a function of information coming from the first measurement sensors 17, and thus as a function either of the forces currently being exerted in each suspension bar 5, or of accelerations measured in an end of each suspension bar 5 that is connected to the load-bearing structure 2, depending on the variant.

The information relating to the suspension bars 5 makes it possible to estimate the vibration level in the cabin while also monitoring to check that the forces passing through the suspension bars do not exceed predetermined thresholds guaranteeing the safety of the flight.

Naturally, numerous implementation variations may be made to the present invention. Although several embodiments are described above, it can readily be understood that it is not conceivable to identify exhaustively all of the possible embodiments. It is naturally possible to replace any of the means described with equivalent means without going beyond the ambit of the present invention.

What is claimed is:

1. An aircraft provided with a load-bearing structure and with a main gearbox for driving a rotary wing in rotation, the main gearbox being fastened to said load-bearing structure via at least three suspension bars, wherein said aircraft includes a vibration reduction system provided with an active vibration absorber fastened around each suspension bar, each vibration absorber being provided with a first mass having an upper mass element and a lower mass element connected to an associated suspension bar of the at least three suspension bars via first resilient means allowing the first mass to move along said associated suspension bar, and with a second mass connected to the first mass via second resilient means allowing the second mass to move along said associated suspension bar, the first mass and the second mass each surrounding the associated suspension bar to induce vibration absorption along an absorption axis (AX) coinciding with the extension axis along which the associated suspension bar extends, said vibration absorber having a force generator interposed between the first mass and the second mass and inputting a control force on being instructed by a control unit as a function of information coming from at least one first measurement sensor for sensing monitoring parameters for monitoring the associated suspension bar, wherein the second mass has an intermediate mass element positioned between the upper mass element and the lower mass element, and wherein the second resilient means includes a first resilient member and a second resilient member, the intermediate mass element fastened to the lower mass element via the first resilient member and fastened to the upper mass element via the second resilient member such that the intermediate mass element is configured to move along the associated suspension bar.

2. An aircraft according to claim 1, wherein said first measurement sensor of the associated suspension bar includes either a force sensor for sensing forces passing through said suspension bar, or an accelerometer arranged at an end of said associated suspension bar that is fastened to the load-bearing structure.

3. An aircraft according to claim 1, wherein said vibration reduction system has at least one second measurement sensor arranged in a cabin of the aircraft and communicating with said control unit, each second measurement sensor being chosen from a list including a noise sensor and an accelerometer.

4. An aircraft according to claim 1, wherein said force generator has at least one electromagnetic actuator.

5. An aircraft according to claim 1, wherein said vibration absorber has movement-limiting means for limiting the movement of at least one of said first and second masses.

6. An aircraft according to claim 1, wherein said upper mass element is positioned between the lower mass element and the rotary wing, each of the upper mass element and the lower mass element connected via a spring to the associated suspension bar, said force generator comprising an upper electromagnetic actuator between the second mass and the upper mass element, and a lower electromagnetic actuator between the second mass and the lower mass element.

7. An aircraft according to claim 1, wherein at least one of said first and second masses includes damper means.

8. An aircraft according to claim 1, wherein at least one resilient means comprises at least one volute spring.

9. An aircraft according to claim 1, having a speed sensor for sensing the rotational speed (NR) of the rotary wing, which speed sensor communicates with said control unit.

10. A method of minimizing vibration in a cabin of an aircraft, said aircraft being provided with a load-bearing structure and with a main gearbox for driving a rotary wing in rotation, the main gearbox being fastened to said load-bearing structure via at least three suspension bars, wherein, with said aircraft having a vibration reduction system provided with an active vibration absorber fastened to each suspension bar, each vibration absorber being provided with a first mass and with a second mass between which a force generator is arranged, the first mass having an upper mass element and a lower mass element, the second mass having an intermediate mass element, the method comprising:

fastening the intermediate mass element to the upper mass element via a first resilient member and fastening the intermediate mass element to the lower mass element via a second resilient member such that the intermediate mass element is positioned between the upper and lower mass elements and is configured to move along an associated suspension bar of the at least three suspension bars;

estimating a control force per force generator for minimizing a vibration level relating to the vibration level present in said cabin with a control unit;

putting a bound on said control forces with the control unit so as to obtain a bounded force per force generator as a function of the forces currently passing through each suspension bar so that each current force does not exceed a predetermined threshold; and sending an instruction from the control unit to said force generators so that said force generators generate said bounded forces.

11. A method according to claim 10, further comprising:
measuring forces currently passing through each suspension bar;
determining a vibration level relating to the vibration level present in said cabin with the control unit, and then estimating the control force to be delivered by said force generators in order to minimize said vibration level, said control unit bounding said control forces so as to obtain forces that are bounded as a function of the current forces so that each current force does not exceed a predetermined threshold;
sending an instruction from the control unit to said force generators so that said force generators generate said bounded forces;
performing the following operations with the control unit iteratively:
determining the actual vibration level resulting from the latest instruction transmitted to said force generators for countering the latest measured vibration level with the control unit;
determining a current vibration level and then determines the difference between said current vibration level and said latest vibration level with the control unit; and
determining new bounded forces on the basis of said difference and of the forces currently being exerted in each suspension bar with the control unit, and then controlling the force generators with the control unit.

12. A method according to claim 11 further comprising determining a vibration level relating to the vibration level present in the cabin as a function of the forces currently being exerted in each suspension bar with the control unit.

13. A method according to claim 10 further comprising determining a vibration level relating to the vibration level present in the cabin as a function of accelerations measured in an end of each suspension bar that is connected to the load-bearing structure with the control unit.

14. A method according to claim 10 further comprising determining a vibration level relating to the vibration level present in said cabin as a function of information coming from at least one acoustic sensor and/or from at least one accelerometer present in the cabin of the aircraft with the control unit.

15. A method according to claim 10 further comprising measuring the rotational speed (NR) of said rotary wing in order to synchronize the bounded control forces generated by the force generators with the rotational frequency of said rotary wing.

16. An aircraft comprising:
a load-bearing structure;
a main gearbox driving a rotary wing in rotation;
at least three suspension bars fastening the main gearbox to the load-bearing structure; and
a vibration reduction system having an active vibration absorber fastened around each suspension bar, each vibration absorber comprising:
a first mass having a lower mass element and an upper mass element, an upper mass element positioned between the lower mass element and the rotary wing, the lower mass element connected to an associated suspension bar of the at least three suspension bars via a first spring configured to allow the lower mass element to move along the associated suspension bar, the upper mass element connected to the associated suspension bar via a second spring configured to allow the upper mass element to move along the associated suspension bar,
a second mass having an intermediate mass element positioned between the upper mass element and the lower mass element, the intermediate mass element fastened to the lower mass element via a first resilient member and fastened to the upper mass element via a second resilient member such that the intermediate mass element is configured to move along the associated suspension bar, and
a force generator having a lower electromagnetic actuator and an upper electromagnetic actuator, the lower electromagnetic actuator positioned between the intermediate mass element and the lower mass element, and the upper electromagnetic actuator positioned between the intermediate mass element and the upper mass element; and
a control unit;
wherein the force generator is configured to input a control force on being instructed by the control unit as a function of information coming from at least one first measurement sensor for sensing monitoring parameters for monitoring the associated suspension bar;
wherein the lower mass element, the upper mass element, and the intermediate mass element each surround the associated suspension bar; and
wherein the lower mass element, the upper mass element, and the intermediate mass element are configured to induce vibration absorption along an absorption axis (AX) coinciding with the extension axis along which the associated suspension bar extends.

17. The aircraft according to claim 16 wherein each vibration absorber further comprises a casing through which the associated suspension bar passes, the casing having an inner periphery in contact with the associated suspension bar;
wherein the lower mass element is connected to the associated suspension bar via the first spring being connected to the inner periphery; and
wherein the upper mass element is connected to the associated suspension bar via the second spring being connected to the inner periphery.

18. The aircraft according to claim 16 wherein the first resilient member is radially spaced apart from the first spring; and
wherein the second resilient member is radially spaced apart from the second spring.

19. The aircraft according to claim 16 wherein the first mass provides a first stage of the vibration absorber presenting a predetermined resonance frequency; and
wherein the second mass provides a second stage of the vibration absorber presenting a resonance frequency adjustable using the force generator.

20. The aircraft according to claim 16 wherein the second mass is solely supported by the first mass.

* * * * *